(12) United States Patent
Lee et al.

(10) Patent No.: US 11,088,429 B2
(45) Date of Patent: Aug. 10, 2021

(54) CAP ASSEMBLY AND SECONDARY BATTERY INCLUDING THE SAME

(71) Applicant: SAMSUNG SDI CO., LTD., Yongin-si (KR)

(72) Inventors: Sang-Hyo Lee, Yongin-si (KR); Won-Il Jung, Yongin-si (KR); Yoon-Chang Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 276 days.

(21) Appl. No.: 14/581,773

(22) Filed: Dec. 23, 2014

(65) Prior Publication Data

US 2015/0236334 A1    Aug. 20, 2015

(30) Foreign Application Priority Data

Feb. 20, 2014  (KR) .................. 10-2014-0019690

(51) Int. Cl.
| | |
|---|---|
| *H01M 50/578* | (2021.01) |
| *H01M 50/30* | (2021.01) |
| *H01M 50/147* | (2021.01) |
| *H01M 50/152* | (2021.01) |
| *H01M 50/308* | (2021.01) |
| *H01M 50/325* | (2021.01) |
| *H01M 50/342* | (2021.01) |
| *H01M 50/375* | (2021.01) |
| *H01M 10/04* | (2006.01) |

(52) U.S. Cl.
CPC ..... *H01M 50/578* (2021.01); *H01M 10/0422* (2013.01); *H01M 50/147* (2021.01); *H01M 50/152* (2021.01); *H01M 50/30* (2021.01); *H01M 50/308* (2021.01); *H01M 50/325* (2021.01); *H01M 50/3425* (2021.01); *H01M 50/375* (2021.01); *H01M 2200/20* (2013.01); *Y02E 60/10* (2013.01)

(58) Field of Classification Search
CPC .................................................. H01M 2/1241
See application file for complete search history.

(56) References Cited

U.S. PATENT DOCUMENTS

| | | |
|---|---|---|
| 7,060,386 B2 | 6/2006 | Abe |
| 7,572,544 B2 | 8/2009 | Kozuki et al. |

(Continued)

FOREIGN PATENT DOCUMENTS

| | | |
|---|---|---|
| CN | 100544069 C | 9/2009 |
| CN | 101540414 A | 9/2009 |

(Continued)

OTHER PUBLICATIONS

Machine translation of JP-11250884-A (Year: 1999).*

(Continued)

*Primary Examiner* — Barbara L Gilliam
*Assistant Examiner* — Helen M McDermott
(74) *Attorney, Agent, or Firm* — Lewis Roca Rothgerber Christie LLP (57) ABSTRACT

A cap assembly and a secondary battery including the cap assembly including a cap-down, and at least a portion thereof is configured to open when pressure is applied to the cap-down, a vent portion, and at least a portion thereof is configured to open when pressure is applied to the vent portion, and a cap-up electrically connected to the vent portion.

38 Claims, 7 Drawing Sheets

(56) References Cited

U.S. PATENT DOCUMENTS

| | | | |
|---|---|---|---|
| 8,486,546 B2 | 7/2013 | Kim et al. | |
| 8,936,861 B2 | 1/2015 | Kiyama et al. | |
| 8,986,876 B2 | 3/2015 | Kim | |
| 9,397,323 B2 | 7/2016 | Kim | |
| 9,601,735 B2 | 3/2017 | Yokoyama | |
| 2003/0034758 A1* | 2/2003 | Abe | H01M 2/1241 320/147 |
| 2003/0232236 A1* | 12/2003 | Mitchell | H01M 2/0212 429/56 |
| 2008/0171260 A1 | 7/2008 | Kim et al. | |
| 2009/0233160 A1 | 9/2009 | Kim | |
| 2010/0136388 A1* | 6/2010 | Kim | H01M 2/1241 429/56 |
| 2010/0159288 A1 | 6/2010 | Kim | |
| 2011/0076527 A1* | 3/2011 | Kim | H01M 2/0413 429/53 |
| 2011/0117398 A1 | 5/2011 | Kang | |
| 2011/0123853 A1 | 5/2011 | Kim | |
| 2012/0100404 A1* | 4/2012 | Lee | H01M 2/0413 429/82 |
| 2013/0122357 A1* | 5/2013 | Li | H01M 50/10 429/185 |
| 2013/0177785 A1* | 7/2013 | Hwang | H01M 50/3425 429/53 |
| 2014/0045009 A1 | 2/2014 | Kim | |
| 2014/0127541 A1 | 5/2014 | Kubota et al. | |
| 2015/0072179 A1* | 3/2015 | Itabashi | H01M 2/1241 429/7 |
| 2015/0236316 A1* | 8/2015 | Shimizu | H01M 50/155 429/56 |

FOREIGN PATENT DOCUMENTS

| | | | | |
|---|---|---|---|---|
| CN | 102210041 A | | 10/2011 | |
| EP | 2 219 247 A1 | | 8/2010 | |
| JP | 11250884 A | * | 9/1999 | |
| JP | 11-273651 A | | 10/1999 | |
| JP | 2001-60454 A | | 3/2001 | |
| JP | 2008251187 A | * | 10/2008 | |
| JP | 2009-123529 A | | 6/2009 | |
| JP | 2010-250970 A | | 11/2010 | |
| JP | 2012-204226 A | | 10/2012 | |
| JP | WO 2013111318 A1 | * | 8/2013 | H01M 2/1241 |
| KR | 10-0734758 B1 | | 7/2007 | |
| KR | 10-2009-0026419 A | | 3/2009 | |
| KR | 10-2010-0062886 A | | 6/2010 | |
| KR | 10-2011-0057987 | | 6/2011 | |
| KR | 10-1050535 B1 | | 7/2011 | |
| WO | WO 2012/176233 A1 | | 12/2012 | |

OTHER PUBLICATIONS

Machine translation of JP-2008251187-A (Year: 2008).*
Extended European Search Report for Application No. EP 15 151 989.9, dated Jul. 7, 2015, 6 pages.
EPO Office Action dated Aug. 16, 2017, for corresponding European Patent Application No. 15151989.9 (7 pages).
SIPO Office Action, with English translation, dated May 3, 2018, for corresponding Chinese Patent Application No. 201510082648.2 (18 pages).
Chinese Office action with English Translation dated Dec. 29, 2018 issued by the CNO for corresponding Chinese Patent Application No. 201510082648.2, 10 pages.
Japan Office Action, dated Feb. 5, 2019 for corresponding JP Application No. 2015-026337 (4 pages).
Chinese Office Action, with English translation, dated May 3, 2018, for corresponding Chinese Patent Application No. 201510082648.2 (18 pages).
Korean Office Action dated Apr. 29, 2020, for corresponding Korean Patent Application No. 10-2014-0019690 (109 pages).

* cited by examiner

CAP ASSEMBLY AND SECONDARY BATTERY INCLUDING THE SAME

CROSS-REFERENCE TO RELATED APPLICATION

This application claims priority to and the benefit of Korean Patent Application No. 10-2014-0019690, filed on Feb. 20, 2014, in the Korean Intellectual Property Office, the entire content of which is incorporated herein by reference.

BACKGROUND

1. Field

One or more embodiments of the present invention are directed to a cap assembly and a secondary battery including the same.

2. Description of the Related Art

A typical secondary battery includes an electrode assembly having a cylindrical shape, a can having a cylindrical shape and accommodating the electrode assembly, an electrolyte injected into the can and enabling the movement of lithium (Li) ions, and a cap assembly coupled to a side of the can and preventing leakage of the electrolyte and separation of the electrode assembly. Such secondary batteries generally have capacities of about 2000 to about 4000 mAH, and are mainly used in personal computers, digital cameras, camcorders, and electric vehicles that require large power capacity.

A plurality of secondary batteries may be connected in series or in parallel, assembled into a hard pack of a particular shape by including a protection circuit, and included in electronic devices to serve as a power supply. Methods of manufacturing secondary batteries include forming an electrode assembly by stacking together a negative electrode plate coated with a negative electrode active material, a separator, and a positive electrode plate coated with a positive electrode active material, and winding the negative electrode plate, the separator, and the positive electrode plate in an approximately cylindrical shape.

Next, the electrode assembly is inserted into a can having a cylindrical shape, an electrolyte is injected into the cylindrical can, and a cap assembly is coupled to an upper portion of the cylindrical can, thus manufacturing a lithium-ion battery having a cylindrical shape.

In order to prevent or reduce the possibility of explosion and/or ignition of the secondary battery, the battery may include a safety vent that changes its shape and interrupts the current if the internal pressure of the battery increases due to over-charging. The structure including the safety vent is usually referred to as a current interrupt device (CID), and is often a component of the cap assembly.

SUMMARY

One or more embodiments of the present invention include a cap assembly and a secondary battery including the same.

Additional aspects will be set forth in part in the description which follows and, in part, will be apparent from the description, or may be learned by practice of the presented embodiments.

According to one or more embodiments of the present invention, a cap assembly includes a cap-down, at least a portion of the cap-down configured to open when pressure is applied to the cap-down; a vent portion, at least a portion of the vent portion is configured to open when pressure is applied to the vent portion; and a cap-up electrically connected to the vent portion.

The cap-down may include a dislocation portion configured to open when pressure is applied to the cap-down, and a second notch portion formed around the dislocation portion to define a region of the dislocation portion that opens when pressure is applied to the cap-down.

The cap-down may further include a support portion in the second notch portion and connecting the dislocation portion with another region of the cap-down.

A thickness of the second notch portion may be smaller than a thickness of the dislocation portion.

There may be at least one dislocation portion and at least one second notch portion; and when there is a plurality of dislocation portions and a plurality of second notch portions, the plurality of dislocation portions may be spaced from one another, and each of the plurality of second notch portions may be formed around each of the plurality of dislocation portions.

Each of the plurality of dislocation portions may form the same angle with a center of the cap-down.

Each of the plurality of dislocation portions may be the same distance away from a center of the cap-down.

The dislocation portion and the second notch portion may be circles.

At least a portion of the cap-down may include a dislocation portion configured to open when internal pressure of a can increases.

A thickness of the dislocation portion may be smaller than a thickness of the region of the cap-down not including the dislocation portion.

There may be a plurality of dislocation portions and the plurality of dislocation portions may be spaced from one another.

Each of the plurality of dislocation portions may form the same angle with a center of the cap-down.

Each of the plurality of dislocation portions may be the same distance away from a center of the cap-down.

The dislocation portion may be a circle.

An edge of the vent portion may extend beyond an edge of the cap-up and may be bent to cover at least a portion of an upper surface of the cap-up.

An opening may be formed in a center of the cap-down, and the cap assembly may further include a sub-disk covering the opening in the center of the cap-down.

The cap assembly may further include a sub-disk coupled to the cap-down.

The cap assembly may further include an insulator between the vent portion and the cap-down.

The insulator may cover an outside edge of at least one of the cap-down, the vent portion, and the cap-up.

The cap assembly may further include a cover plate covering the insulator and including a fluid hole.

An area of the fluid hole may be 10 mm$^2$ or less.

The cap-down may include a second lower plate; a second upper plate spaced from the second lower plate; and a plurality of second bridge portions connecting the second upper plate and the second lower plate, and spaces between adjacent second bridge portions include the insulator.

According to one or more embodiments of the present invention, a secondary battery includes: an electrode assembly; a can accommodating the electrode assembly and including an opening; and a cap assembly covering the opening, wherein the cap assembly includes: a cap-down, at least a portion of the cap-down configured to open when internal pressure of the can increases; a vent portion, at least a portion of the vent portion configured to open when internal pressure of the can increases; and a cap-up electrically connected to the vent portion.

The cap-down may include a dislocation portion configured to open when internal pressure of the can increases; and a second notch portion formed around the dislocation portion and defining a region of the dislocation portion that opens when internal pressure of the can increases.

The cap-down may further include a support portion in the second notch portion and connecting the dislocation portion with another region of the cap-down.

A thickness of the second notch portion may be smaller than a thickness of the dislocation portion.

There may be at least one dislocation portion and at least one second notch portion; and when there are a plurality of dislocation portions and a plurality of second notch portions, the plurality of dislocation portions may be spaced from one another, and each of the plurality of second notch portions may be formed around each of the plurality of dislocation portions.

Each of the plurality of dislocation portions may form the same angle with a center of the cap-down.

Each of the plurality of dislocation portions may be the same distance away from a center of the cap-down.

The dislocation portion and the second notch portion may be circles.

At least a portion of the cap-down may include a dislocation portion configured to open when internal pressure of the can increases.

A thickness of the dislocation portion may be smaller than a thickness of the region of the cap-down not including the dislocation portion.

There may be a plurality of dislocation portions and the plurality of dislocation portions may be spaced from one another.

Each of the plurality of dislocation portions may form the same angle with a center of the cap-down.

Each of the plurality of dislocation portions may the same distance away from a center of the cap-down.

The dislocation portion may be a circle.

An edge of the vent portion may extend beyond an edge of the cap-up and may be bent to cover at least a portion of an upper portion of the cap-up.

An opening may be formed in a center of the cap-down, and the secondary battery may further include a sub-disk covering the opening in the center of the cap-down.

The secondary battery may further include a sub-disk coupled to the cap-down.

The secondary battery may further include an insulator between the vent portion and the cap-down.

The insulator may cover an outside edge of at least one of the cap-down, the vent portion, and the cap-up.

The secondary battery may further include a cover plate covering the insulator and including a fluid hole.

An area of the fluid hole may be 10 mm$^2$ or less.

The cap-down may include a second lower plate, a second upper plate spaced from the second lower plate, and a plurality of second bridge portions connecting the second upper plate and the second lower plate, and spaces between adjacent second bridge portions may include the insulator.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. However, the present embodiments may have different forms and should not be construed as being limited to the descriptions set forth herein. Accordingly, the embodiments are merely described below, by referring to the figures, to explain aspects of the present description. As used herein, the singular forms "a," "an," and "the," are intended to include the plural forms as well, unless the context clearly displays otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. It will be understood that although the terms "first", "second", etc. may be used herein to describe various components, these components should not be limited by these terms. These components are only used to distinguish one component from another. Expressions such as "at least one of," when preceding a list of elements, modify the entire list of elements and do not modify the individual elements of the list. Further, the use of "may" when describing embodiments of the present invention refers to "one or more embodiments of the present invention."

Figure 1:
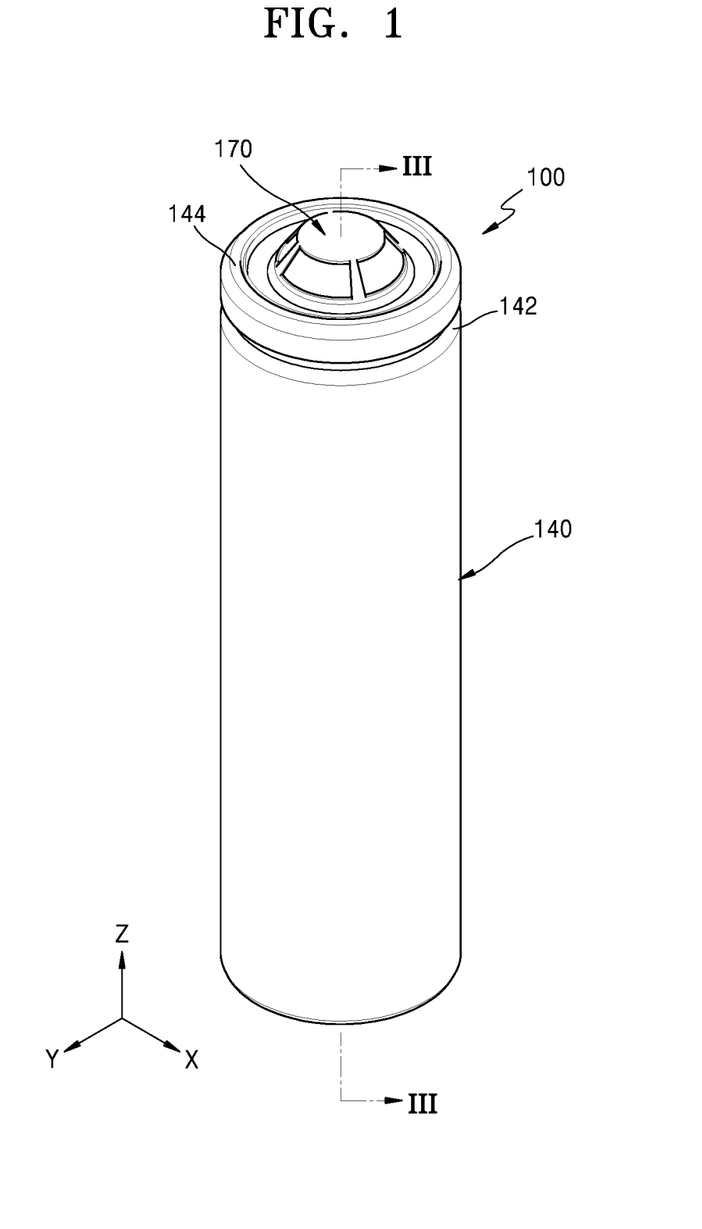
FIG. 1 is a perspective view of a secondary battery according to an embodiment of the present invention.
Figure 2:
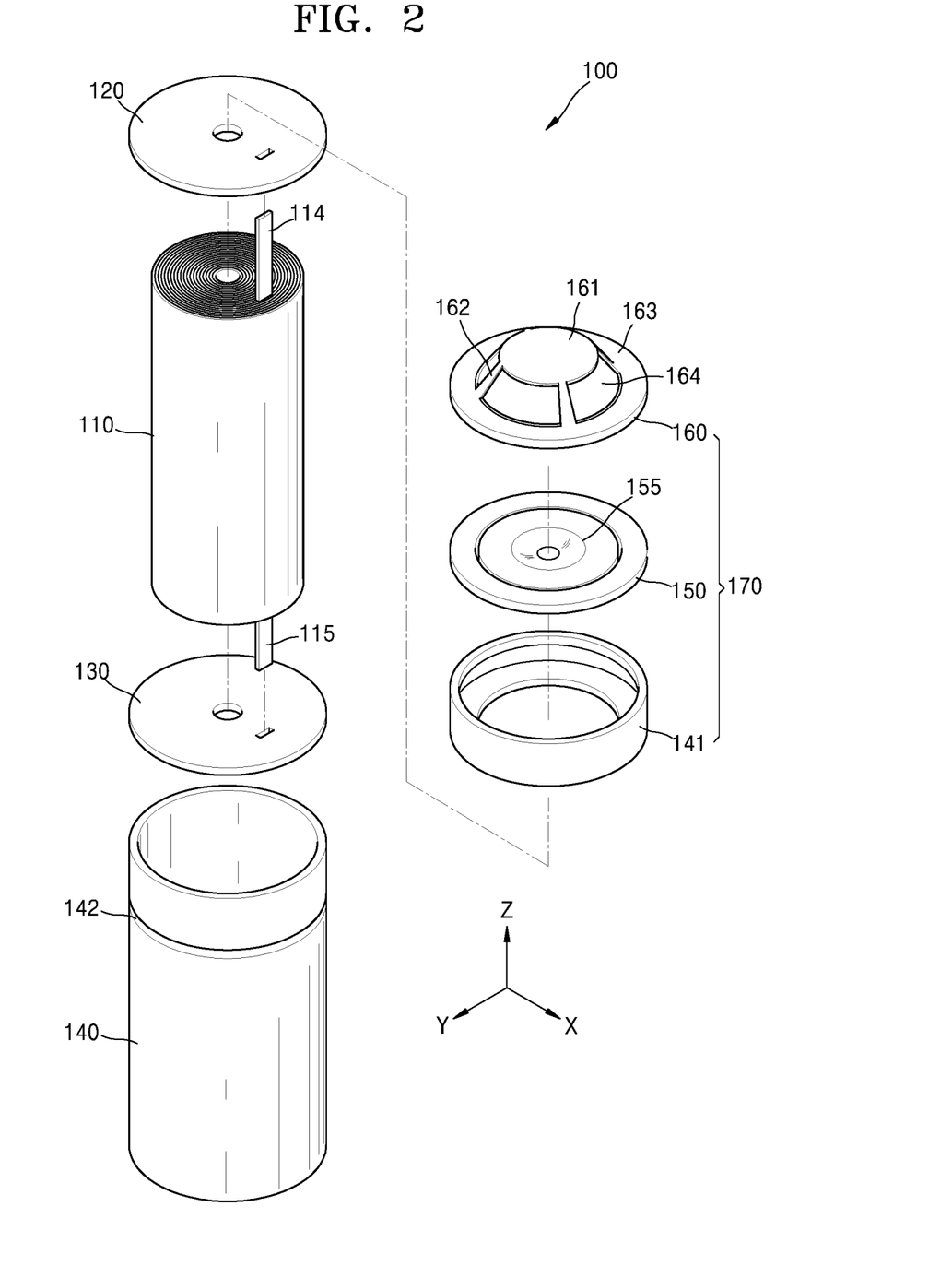
FIG. 2 is an exploded perspective view of the secondary battery of FIG. 1.
Figure 3:
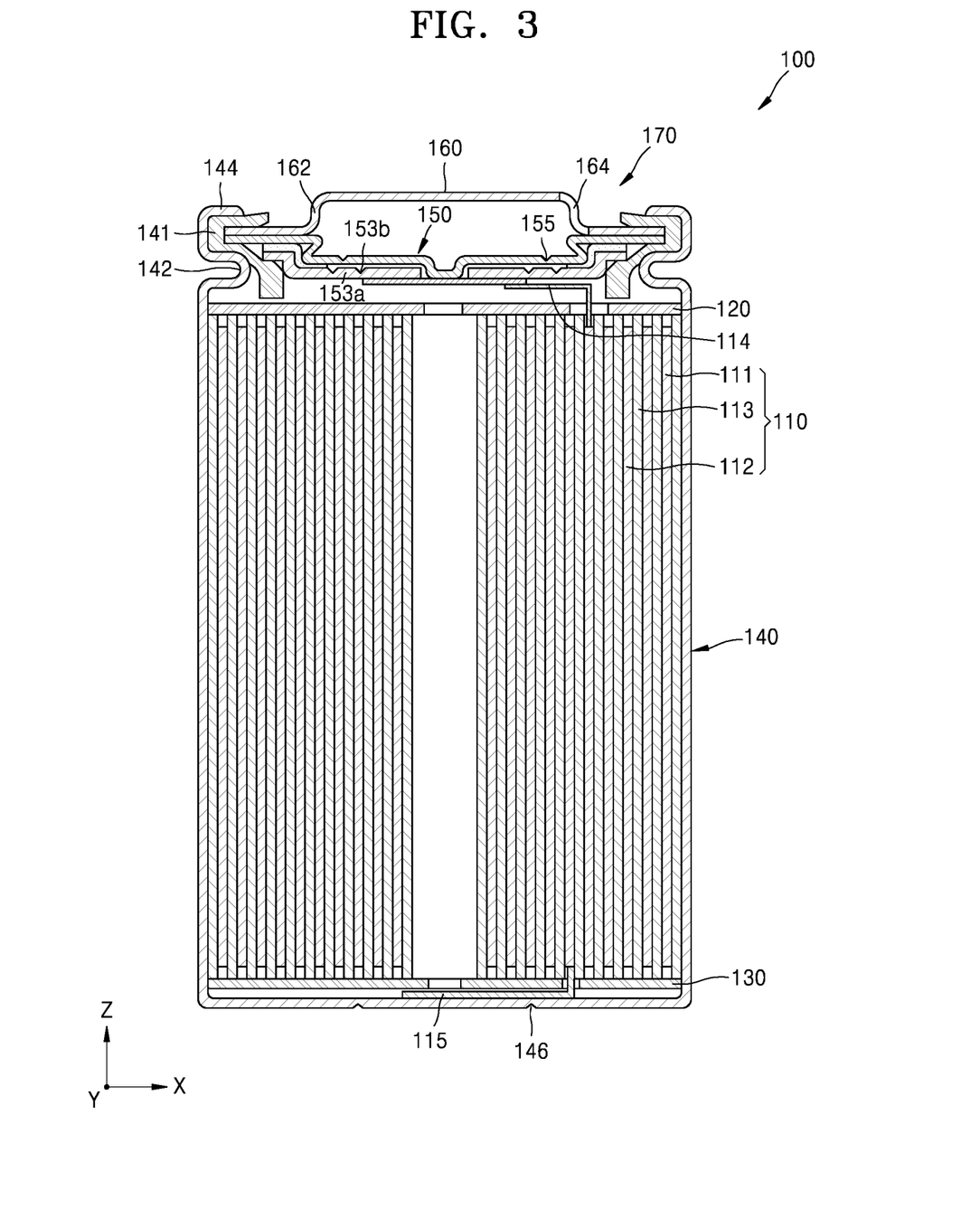
FIG. 3 is a cross-sectional view taken along line III-III of FIG. 1.

FIG. 1 is a perspective view of a secondary battery 100 according to an embodiment of the present invention. FIG. 2 is an exploded perspective view of the secondary battery 100 of FIG. 1. FIG. 3 is a cross-sectional view taken along line of FIG. 1.

Referring to FIGS. 1 through 3, the secondary battery 100 may include an electrode assembly 110, a can 140 accommodating the electrode assembly 110, and a cap assembly 170 coupled to the can 140.

The electrode assembly 110 may include a first electrode plate 111, a second electrode plate 112, and a separator 113 between the first electrode plate 111 and the second electrode plate 112. In one embodiment, the electrode assembly 110 may be manufactured by sequentially stacking the first electrode plate 111, the separator 113, and the second electrode plate 112, and winding the first electrode plate 111, the separator 113, and the second electrode plate 112 in a jelly-roll shape.

In one embodiment, the electrode assembly 110 may be formed to correspond to the shape of the can 140. For example, when the can 140 has an oval shape, the electrode assembly 110 may have an oval jelly-roll shape. However, hereinafter, solely for convenience of explanation, circular can 140 and electrode assembly 110 will be described.

The first electrode plate 111 may be a positive electrode film or a negative electrode film. When the first electrode plate 111 is a positive electrode film, the second electrode plate 112 may be a negative electrode film, and when the first electrode plate 111 is a negative electrode film, the second electrode plate 112 may be a positive electrode film. In other words, the first electrode plate 111 and the second electrode plate 112 may have different electrical polarities, and are not limited to specific electrical polarities. However, hereinafter, solely for convenience of explanation, the first electrode plate 111 will be described as a positive electrode film, and the second electrode plate 112 as a negative electrode film.

The first electrode plate 111 may include a first active material portion coated with a first active material, and a first non-coated portion not coated with the first active material. In one embodiment, the first active material portion may be formed by coating a portion of at least one surface of an aluminum (Al) plate with the first active material, and the first non-coated portion may be formed by leaving the rest of the Al plate not coated with the first active material. The first active material may be a positive electrode active material, and may be, for example, a lithium (Li)-containing transition metal oxide, such as $LiCoO_2$, $LiNiO_2$, $LiMnO_2$, and $LiMnO4$, or a Li chalcogenide compound.

The second electrode plate 112 may include a second active material portion coated with a second active material and a second non-coated portion not coated with the second active material. The second active material portion may be formed by coating a portion of at least one surface of a copper (Cu) plate with the second active material, and the second non-coated portion may be formed by leaving the rest of the Cu plate not coated with the second active material. The second active material may be a negative electrode active material, and may be, for example, a carbon material, such as crystalline carbon, amorphous carbon, a carbon compound, and a carbon fiber, a Li metal, or a Li alloy.

The separator 113 may be a porous polymer film, such as a polyethylene (PE) film or a polypropylene (PP) film. The separator 113 may further include ceramic particles and may be formed of a solid polyelectrolyte. The separator 113 may be formed as an independent film, or as a nonconductive porous layer on the first electrode plate 111 or the second electrode plate 112.

In one embodiment, a first electrode tab 114 is electrically connected to the first electrode plate 111, and a second electrode tab 115 is electrically connected to the second electrode plate 112. One end of the first electrode tab 114 may be connected to the first non-coated portion by, for example, welding, and the other end of the first electrode tab 114 may be electrically connected to a current breaking portion 150. In one embodiment, one end of the second electrode tab 115 may be connected to the second non-coated portion by, for example, welding, and the other end of the second electrode tab 115 may be welded to a bottom surface of the can 140.

In one embodiment, one side of the can 140 includes an opening, and the electrode assembly 110 may be inserted into the can 140 through the opening. The can 140 may have, for example, a cylindrical shape, but is not limited thereto. The can 140 may be formed of a conductive material such as, for example, aluminum, and may protect the electrode assembly 110 from external shock, as well as function as a heat-insulating board that releases the heat generated by the charge and discharge operations of the electrode assembly 110 to the outside. In embodiments where the bottom surface of the can 140 is electrically connected to the second electrode tab 115 by welding, the can 140 may function as a second electrode.

A third notch portion 146 may be formed at the bottom of the can 140. When internal pressure of the can 140 increases, the third notch portion 146 may change its shape or may break to emit the gas generated inside the can 140 to the outside.

A first insulating plate 120 and a second insulating plate 130 may be respectively positioned at the ends of the electrode assembly 110, inside the can 140. The first insulating plate 120 may be placed between an upper surface of the electrode assembly 110 and the cap assembly 170, thereby insulating the electrode assembly 110 from the cap assembly 170. The second insulating plate 130 may be placed between the electrode assembly 110 and the bottom surface of the can 140, thereby insulating the electrode assembly 110 from the can 140.

In one embodiment, the cap assembly 170 is coupled to the can 140 and seals the opening at the side of the can 140. In one embodiment, a beading portion 142 is formed on the side of the can 140 and is dented toward the inside of the can 140. The cap assembly 170 is inserted inside the can 140 through the beading portion 142, and a top portion of the can 140 is then bent toward the inside of the can 140 to cover the edges of the cap assembly 170, thus forming a crimping portion 144. Accordingly, the cap assembly 170 may be combined with the can 140. In one embodiment, the beading portion 142 and the crimping portion 144 firmly attach the cap assembly 170 to the can 140, thereby preventing or reducing the possibility of dislocation of the cap assembly 170 and leakage of the electrolyte.

The cap assembly 170 may include a gasket 141, the current breaking portion 150, and a cap-up 160.

In one embodiment, the gasket 141 is positioned at the top of the can 140 and has a ring-like shape. The current breaking portion 150 and the cap-up 160 are fixed to each other inside the gasket 141, such that the gasket 141, the current breaking portion 150, and the cap-up 160 together correspond to the shape of the crimping portion 144. In addition, the gasket 141 insulates the current breaking portion 150 and the cap-up 160 from the can 140. As illustrated in FIG. 3, the cap-up 160 is positioned on the current breaking portion 150, and the cap-up 160 and the current breaking portion 150 are fixed to each other inside the gasket 141. However, embodiments of the present invention are not limited thereto. In another embodiment, the edge of the current breaking portion 150 may extend beyond the edge of the cap-up 160 and may be bent so as to cover the edge of the cap-up 160, thus attaching the current breaking portion 150 to the cap-up 160. Specifically, an edge of a vent portion 154 of the current breaking portion 150 may extend beyond the edge of the cap-up 160 and may be bent to cover the edge of the cap-up 160, thus attaching the current breaking portion 150 to the cap-up 160. Additionally, the current breaking portion 150 and the cap-up 160 may be further fixed together by the gasket 141.

A first notch portion 155 of the current breaking portion 150 may break when the pressure inside the can 140 increases, thus interrupting the current and emitting the gas to the outside. In one embodiment, the current breaking portion 150 includes a dislocation portion 153a (or 253 in another embodiment), which can open or rupture when internal pressure inside the can 140 increases, thus providing a passage through which the gas may be emitted toward the cap-up 160. In one embodiment, the dislocation portion 153a (or 253) may allow the gas to evenly flow towards the top and bottom of the can 140, such that the first notch portion 155 and the third notch portion 146 both rupture.

In embodiments where the current breaking portion 150 is electrically connected to the first electrode tab 114, the cap-up 160 may be connected to the current breaking portion 150 and may function as the first electrode. In one embodiment, the cap-up 160 includes a plurality of through-holes 164 that aid in gas emission, and first bridge portions 162 formed between the plurality of through-holes 164. The cap-up 160 may also include a first upper plate 161 and a first lower plate 163, both connected to the first bridge portions 162. In one embodiment, the first upper plate 161 and the first lower plate 163 may be spaced from each other. For example, the first upper plate 161 and the first lower plate 163 may be positioned one on top of the other.

Hereinafter, the current breaking portion 150 will be described.

Figure 4:
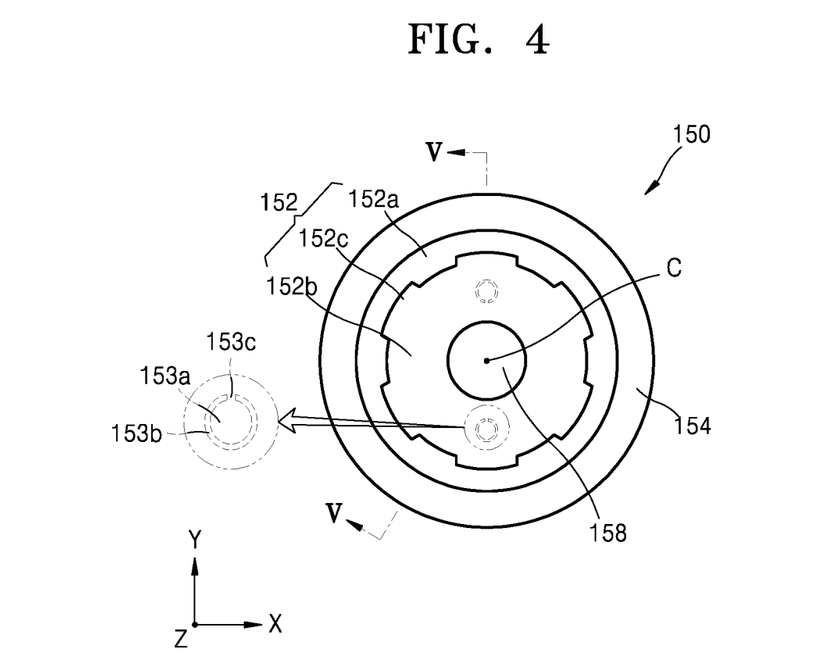
FIG. 4 is a plan view of a current breaking portion illustrated in FIG. 3 according to one embodiment.
Figure 5:
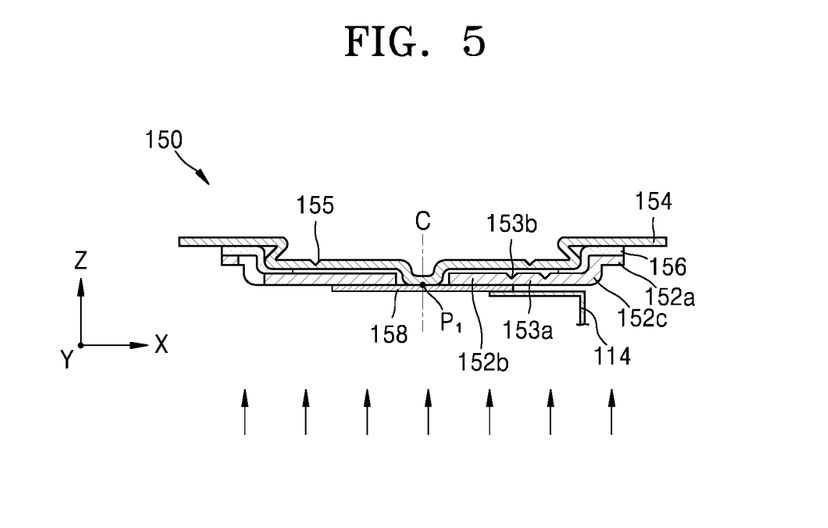
FIG. 5 is a cross-sectional view taken along line V-V of FIG. 4.

FIG. 4 is a plan view of the current breaking portion 150 illustrated in FIG. 3. FIG. 5 is a cross-sectional view taken along line V-V of FIG. 4.

Referring to FIGS. 4 and 5, the current breaking portion 150 may, for example, include a cap-down 152, the vent portion 154, an insulator 156, and a sub-disk 158.

In one embodiment, the cap-down 152 includes an opening in the center, and the vent portion 154 is positioned on the cap-down 152. The insulator 156 is positioned on the outer edge between the cap-down 152 and the vent portion 154, thereby insulating the cap-down 152 from the vent portion 154. In addition, a gap may be formed between the cap-down 152 and the vent portion 154 by the insulator 156.

The cap-down 152 may include a second upper plate 152a having an opening in the center, a second lower plate 152b placed separate and spaced from the second upper plate 152a, and a plurality of second bridge portions 152c connecting the second upper plate 152a and the second lower plate 152b. In one embodiment, the second lower plate 152b and the second upper plate 152a may each be formed by molding, and one may be positioned on top of the other. In one embodiment, spaces between the adjacent second bridge portions 152c may be sealed by the insulator 156.

The vent portion 154 may include the first notch portion 155. The first notch portion 155 may have a groove shape and be relatively thin, and the first notch portion 155 may change its shape or break to emit gas from the can when the internal pressure of the can increases.

The cap-down 152 may include the dislocation portion 153a that may open or rupture when the internal pressure of the can increases, and a second notch portion 153b formed near the dislocation portion 153a. The dislocation portion 153a and the second notch portion 153b may be formed in at least one of the two surfaces of the cap-down 152. In one embodiment, the dislocation portion 153a and the second notch portion 153b may be formed in a first surface of the cap-down 152, to which the sub-disk 158 is coupled. In another embodiment, the dislocation portion 153a and the second notch portion 153b may be formed in a second surface of the cap-down 152, which faces the vent portion 154. In another embodiment, the dislocation portion 153a and the second notch portion 153b may be respectively formed in the first and second surfaces of the cap-down 152. However, hereinafter, solely for convenience of explanation, the dislocation portion 153a and the second notch portion 153b both formed in the second surface of the cap-down 152 will be described.

The second notch portion 153b may be formed around the outer edge of the dislocation portion 153a and may define the region where the dislocation portion 153a is located.

In one embodiment, the cap-down 152 may include a support portion 153c formed on the second notch portion 153b and supporting the dislocation portion 153a by connecting the dislocation portion 153a with another region of the cap-down 152. In one embodiment, the support portion 153c supports the dislocation portion 153a when the second notch portion 153b is fractured, thus preventing or reducing the dislocation portion 153a from breaking away, being damaged, or colliding with other components.

The second notch portion 153b may have a different thickness from the dislocation portion 153a. In one embodiment, the second notch portion 153b may have a groove shape and a relatively small thickness, compared to that of the dislocation portion 153a. In one embodiment, the second notch portion 153b may rupture when the internal pressure of the can increases and may separate the dislocation portion 153a from the cap-down 152.

The second notch portion 153b and the dislocation portion 153a may have various shapes. For example, the dislocation portion 153a and the second notch portion 153b may each be, without limitation, a circle, a quadrangle, a triangle, or a polygon. Hereinafter, solely for convenience of explanation, circular dislocation portion 153a and second notch portion 153b will be described (i.e. the dislocation portion 153a is a circle, and the second notch portion 153b has a circle-ring shape and is formed around the edge of the dislocation portion 153a as described above).

A plurality of dislocation portions 153a and a plurality of second notch portions 153b may be provided. In one embodiment, the plurality of dislocation portions 153a may be spaced from one another. Each of the plurality of second notch portions 153b may be formed around the edge of each of the plurality of dislocation portions 153a and may define the region where each of the plurality of dislocation portions 153a is located.

Each of the plurality of dislocation portions 153a may form the same angle with the center C of the cap-down 152. For example, when there are two dislocation portions 153a, the two dislocation portions 153a may be positioned opposite each other with the center C of the cap-down 152 between the two dislocation portions 153a. In embodiment where there are three dislocation portions 153a, the three dislocation portions 153a may be placed such that angles between the three adjacent dislocation portions are each 120°. While the number of dislocation portions 153a is not limited thereto, hereinafter, solely for convenience of explanation, the cap-down including two dislocation portions 153a will be described.

In one embodiment, the plurality of dislocation portions 153a may be positioned in a radial form with respect to the center C of the cap-down 152, such that the distance between each of the plurality of dislocation portions 153a and the center C of the cap-down 152 may be the same. In one embodiment, a distance between the center of each of the dislocation portions 153a and the center C of the cap-down 152 may be the same.

In one embodiment, the sub-disk 158 is attached to the first surface of the cap-down 152 to cover the opening in the cap-down 152. One surface of the sub-disk 158 may be coupled to the first electrode tab 114, and the other surface of the sub-disk 158 may be electrically connected to the vent portion 154 by, for example, ultrasonic welding, in the region where there is an opening of the cap-down 152.

Hereinafter, method of operation of the current breaking portion 150 will be described.

A secondary battery may overheat due to external radiant heat, rapid heating, over-charging, etc. When the secondary battery overheats, electrolyte additives such as, for example, cyclohexylbenzene (CHB) and biphenyl (BP), may generate gas inside the secondary battery. As a result, the internal pressure inside the can containing the second battery may rapidly increase, and the secondary battery may explode.

In one embodiment of the present invention, when the gas is generated inside the can and the temperature of the gas rises to 600° C. or higher, the insulator 156 between the second bridge portions 152c, as illustrated in FIG. 5, may be burned by the gas.

When the insulator 156 is burned, a space is formed between the end of the cap-down 152 and the end of the vent portion 154, as well as between adjacent second bridge portions 152c, and the gas may flow between the cap-down 152 and the vent portion 154 through the formed space. As the gas pressure in the gap between the cap-down 152 and the vent portion 154 continues to increase, the shape of the vent portion 154 may change, and a combining portion P1 between the cap-down 152 and the sub-disk 158 may be dislocated, thus interrupting the current.

In addition, when the pressure in the gap between the cap-down 152 and the vent portion 154 further increases due to the continuous, flow of gas, the first notch portion 155 may rupture so that the gas inside the can may be released to the outside.

To prevent or reduce the possibility of explosion inside the can that may occur after the first notch portion 155 ruptures, the dislocation portion 153a may rupture after than the first notch portion 155, and the third notch portion 146 may rupture along with the dislocation portion 153a.

If the third notch portion 146 or the dislocation portion 153a do not rupture, a side of the can may rupture or break, thus transmitting heat to the neighboring cans or damaging external devices, and deteriorating the stability of the secondary battery.

In one embodiment, the cap assembly and the secondary battery may open the first notch portion 155, the dislocation portion 153a, and the third notch portion 146, thus preventing or reducing a temperature increase inside the can.

Accordingly, the cap assembly and the secondary battery may smoothly release the combustion gas and materials generated inside the can due to overheating, and may improve the stability of the secondary battery.

Figure 6:
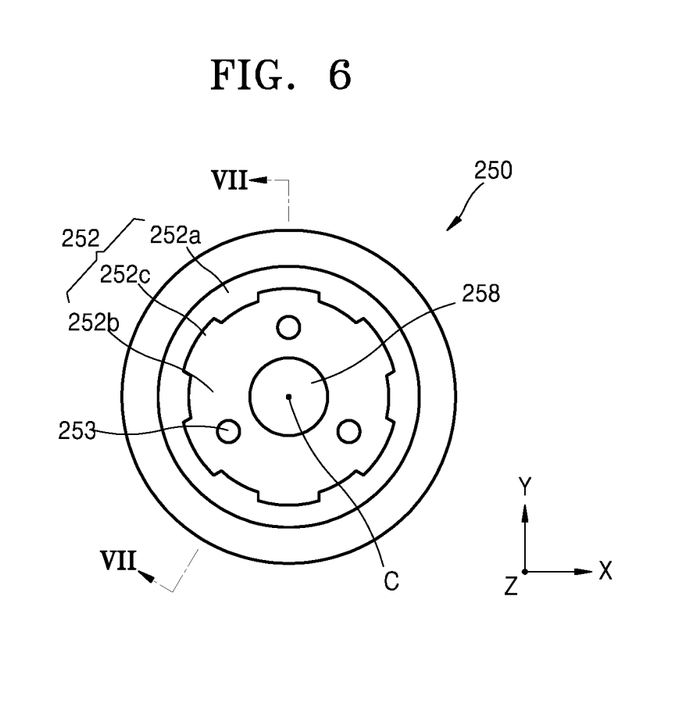
FIG. 6 is a plan view of a current breaking portion illustrated in FIG. 3 according to another embodiment.
Figure 7:
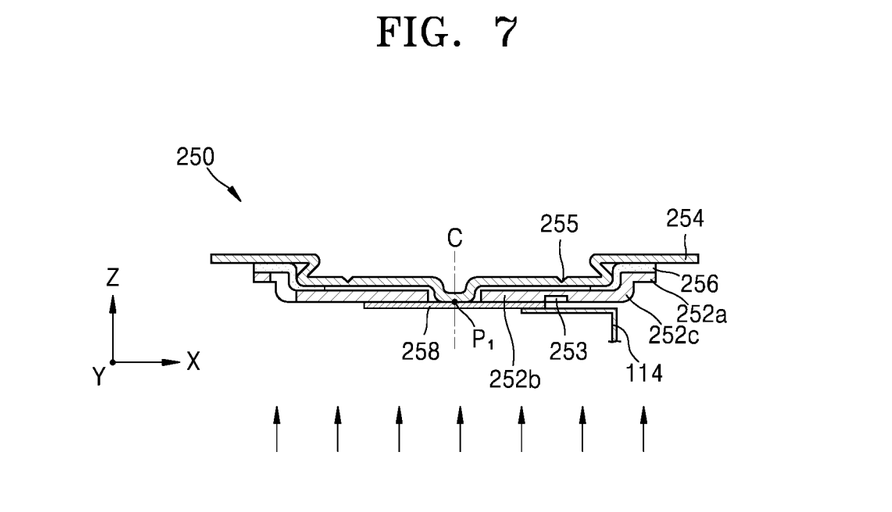
FIG. 7 is a cross-sectional view taken along line VII-VII of FIG. 6.

FIG. 6 is a plan view of the current breaking portion of FIG. 3, according to another embodiment of the present invention. FIG. 7 is a cross-sectional view taken along the line VII-VII of FIG. 6.

Referring to FIGS. 6 and 7, a current breaking portion 250 may include a cap-down 252, a vent portion 254, an insulator 256, and a sub-disk 258. In one embodiment, the vent portion 254, the insulator 256, and the sub-disk 258 are substantially the same as the vent portion 154, the insulator 156, and the sub-disk 158 described above, respectively.

The cap-down 252 may include an opening in the center, and a dislocation portion 253 may be formed around the center of the cap-down 252. In one embodiment, the cap-down 252 may include a second upper plate 252a, a second lower plate 252b, and a plurality of second bridge portions 252c, similar to the second upper plate 152a, the second lower plate 152b, and the plurality of second bridge portions 152c described above, respectively. In one embodiment, the dislocation portion 253 may be formed in the second lower plate 252b.

The dislocation portion 253 may be formed in at least one surface of the cap-down 252. For example, the dislocation portion 253 may be formed only in a first surface of the cap-down 252, to which the sub-disk 258 is attached, or the dislocation portion 253 may be formed only in a second surface of the cap-down 252, which faces the vent portion 254. In one embodiment, the dislocation portion 253 may be formed in both the first and second surfaces of the cap-down 252. However, solely for convenience of explanation, the dislocation portion 253 formed in the first surface of the cap-down 252 will be described.

When the pressure is applied to the dislocation portion 253, the dislocation portion 253 may rupture. In one embodiment, a thickness of the dislocation portion 253 may be different from a thickness of the portions of the cap-down 252, in which the dislocation portion 253 is not formed. For example, the thickness of the dislocation portion 253 may be smaller than the thickness of the portions of the cap-down 252, in which the dislocation portion 253 is not formed.

In embodiments where the thickness of the dislocation portion 253 is smaller than the thickness of the portions of the cap-down 252, in which the dislocation portion 253 is not formed, the dislocation portion 253 may rupture and open when the internal pressure of the can increases. In one embodiment, the dislocation portion 253 may rupture after the first notch portion 255 is opened.

The dislocation portion 253 may have various shapes. For example, the dislocation portion 253 may be circular or quadrangular, but the shape of the dislocation portion 253 is not limited thereto. However, hereinafter, solely for convenience of explanation, the shape of the dislocation portion 253 will be described as circular.

There may be a plurality of dislocation portions 253. In one embodiment, the plurality of dislocation portions 253 may be spaced from one another. Also, the dislocation portions 253 may be placed the same distance away from the center C of the cap-down 252 and may form identical angles with the center C of the cap-down 252. The arrangement of the dislocation portions 253 may be substantially similar to the arrangement of the dislocation portions 153a described above, and descriptions thereof will not be provided again. Hereinafter, solely for convenience of explanation, the cap-down having three dislocation portions 253 will be described.

In one embodiment, the gas generated inside the can may move toward the top and bottom portions of the can. In one embodiment, the gas moving toward the top of the can burns the insulator 256 positioned between the adjacent second bridge portions 252c, and flows into the space formed between the end of the cap-down 252 and the end of the vent portion 254, as well as between the adjacent second bridge portions 252c.

The continuous flow of gas may increase the pressure in the gap between the cap-down 252 and the vent portion 254 and may separate the vent portion 254 from the sub-disk 258 by changing the shape of the vent portion 254, thus interrupting the current.

In addition, when the flow of gas continues to increase the pressure in the gap between the cap-down 252 and the vent portion 254, the first notch portion 255 may rupture and the gas inside the can may be released to the outside. In one embodiment, the dislocation portion 253 and a third notch portion should rupture along with the first notch portion 255.

If the dislocation portion 253 and the third notch portion do not rupture, a side surface of the can may be broken, as described above, and the stability of the secondary battery may deteriorate.

In one embodiment, the dislocation portion 253 may rupture after the first notch portion 255. The third notch portion may rupture at the same time as the dislocation portion 253.

In one embodiment, the first notch portion 255, the dislocation portion 253, and the third notch portion rupture so that the combustion gas and materials generated inside the can may be smoothly released to the outside.

In one embodiment, a cap assembly and the secondary battery described above may rapidly and smoothly release the heat and materials generated inside the can due to overheating, and may improve the stability of the secondary battery.

Figure 8:
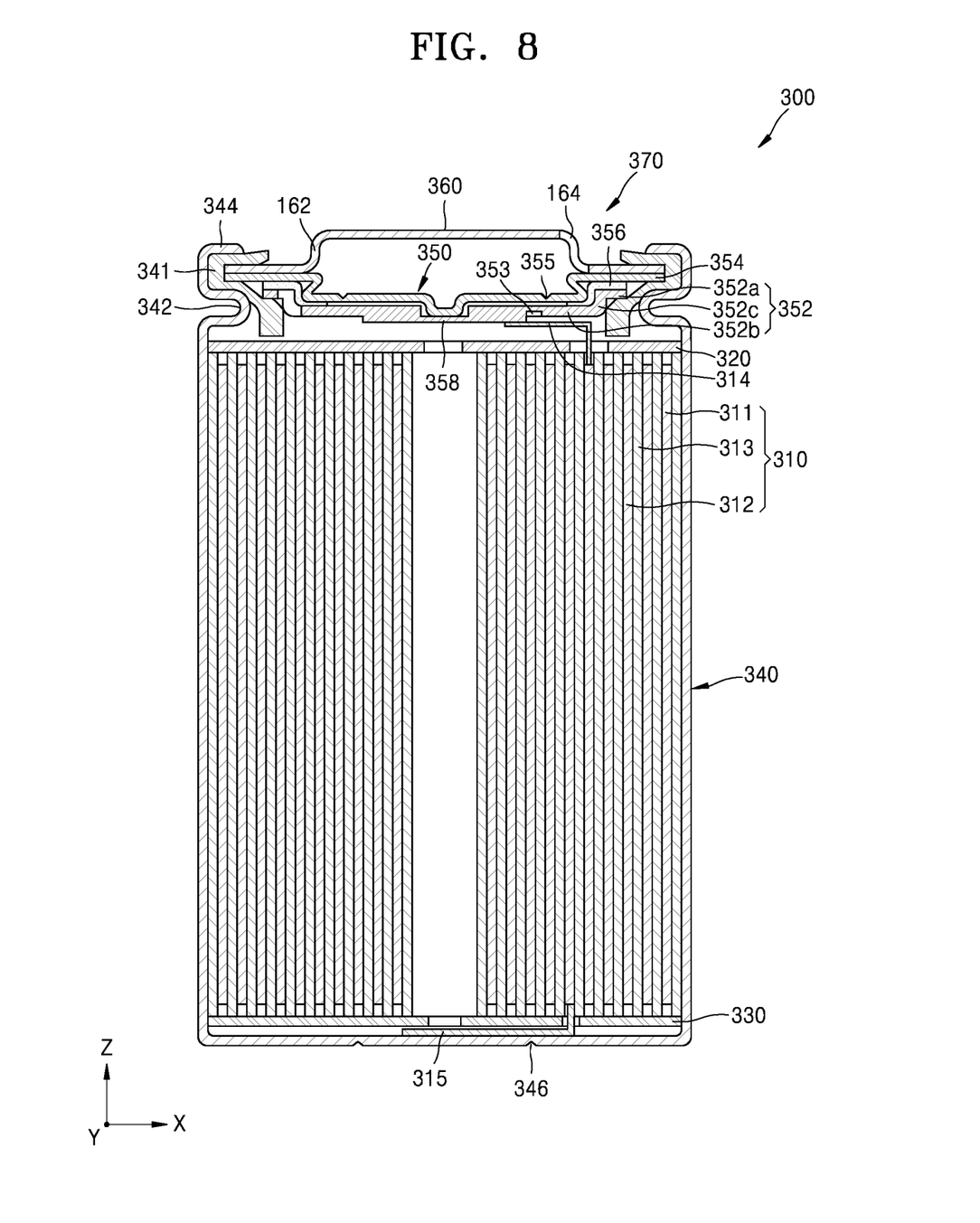
FIG. 8 is a cross-sectional view of a portion of a secondary battery according to an embodiment of the present invention.

FIG. 8 is a cross-sectional view of a portion of a secondary battery 300 according to another embodiment of the present invention.

Referring to FIG. 8, the secondary battery 300 may include an electrode assembly 310, a can 340 containing the electrode assembly 310, and a cap assembly 370 coupled to the can 340. The secondary battery 300 may further include a first insulating plate 320 and a second insulating plate 330, inserted into the can 340. In one embodiment, the first insulating plate 320 and the second insulating plate 330 are substantially the same as the first insulating plate 120 and the second insulating plate 130 described above, respectively.

The can 340 may include a beading portion 342 and a crimping portion 344. In one embodiment, the beading portion 342 and the crimping portion 344 are substantially the same as the beading portion 142 and the crimping portion 144 described above, respectively.

The electrode assembly 310 may include a first electrode plate 311, a second electrode plate 312, and a separator 313. In one embodiment, the first electrode plate 311, the second electrode plate 312, and the separator 313 are substantially the same as the first electrode plate 111, the second electrode plate 112, and the separator 113 described above, respectively.

A first electrode tab 314 may be electrically connected to the first electrode plate 311, and a second electrode tab 315 may be electrically connected to the second electrode plate 312. In one embodiment, the second electrode tab 315 may be connected to the bottom surface of the can 340.

The cap assembly 370 may include a gasket 341, a current breaking portion 350, and a cap-up 360. In one embodiment, the gasket 341 and the cap-up 360 are substantially the same as the gasket 141 and the cap-up 160 described above, respectively.

The current breaking portion 350 may include a vent portion 354 including a first notch portion 355, a cap-down 352 including a second upper plate 352a and a second lower plate 352b connected by a bridge portion 352c, a dislocation portion 353, and a sub-disk 358 coupled to the first electrode tab 314. The current breaking portion 350 may further include an insulator 356 between the vent portion 354 and the cap-down 352. In one embodiment, the first notch portion 355, the vent portion 354, the dislocation portion 353, the cap-down 352, and the insulator 356 are substantially the same as the first notch portion 155, the vent portion 154, the dislocation portion 153a, the cap-down 152, and the insulator 156 described above, respectively.

The sub-disk 358 may be formed under the cap-down 352. In one embodiment, the sub-disk 358 may be formed integrally with the cap-down 352. Specifically, the sub-disk 358 may extend from the cap-down 352 to cover an open center portion of the cap-down 352. In one embodiment, the first electrode tab 314 may be coupled to the sub-disk 358.

In one embodiment, the current breaking portion 350 may operate as described above. For example, when the inside of the can 340 overheats or overcurrents are formed in the electrode assembly 310, high temperature gas may be generated inside the can 340, and the insulator 356 may be burned and destroyed by the gas.

The gas may then move through the spaces between the adjacent second bridge portions 352c formed after the insulator 356 is destroyed, or the gas may move through the space between the end of a second upper plate 352a of the cap-down 352 and the end of the vent portion 354.

The gas moving as described above may increase the pressure in the gap between the cap-down 352 and the vent portion 354, and may separate the vent portion 354 from the sub-disk 358 coupled to the cap-down 352, thus interrupting the current and suspending the power supply. If the pressure in the gap between cap-down 352 and the vent portion 354 continues to increase, the gas may rupture the first notch portion 355 of the vent portion 354 and release the gas.

As the pressure inside the can 340 continues to increase further, the dislocation portion 353 may rupture and open (after the first notch portion 355 has ruptured), so that the gas and the heat generated inside the can 340 may be released to the outside. In one embodiment, a third notch portion 346 may rupture along with the dislocation portion 353, to open the bottom of the can 340 and release the gas.

In one embodiment, when the internal pressure of the can 340 increases, the first notch portion 355, the dislocation portion 353, and the third notch portion 346 of the cap assembly 370 and the secondary battery 300 rupture and open to release the gas, heat, and electrolyte from inside the can 340 to the outside, thus improving the stability of the secondary battery 300.

Figure 9:
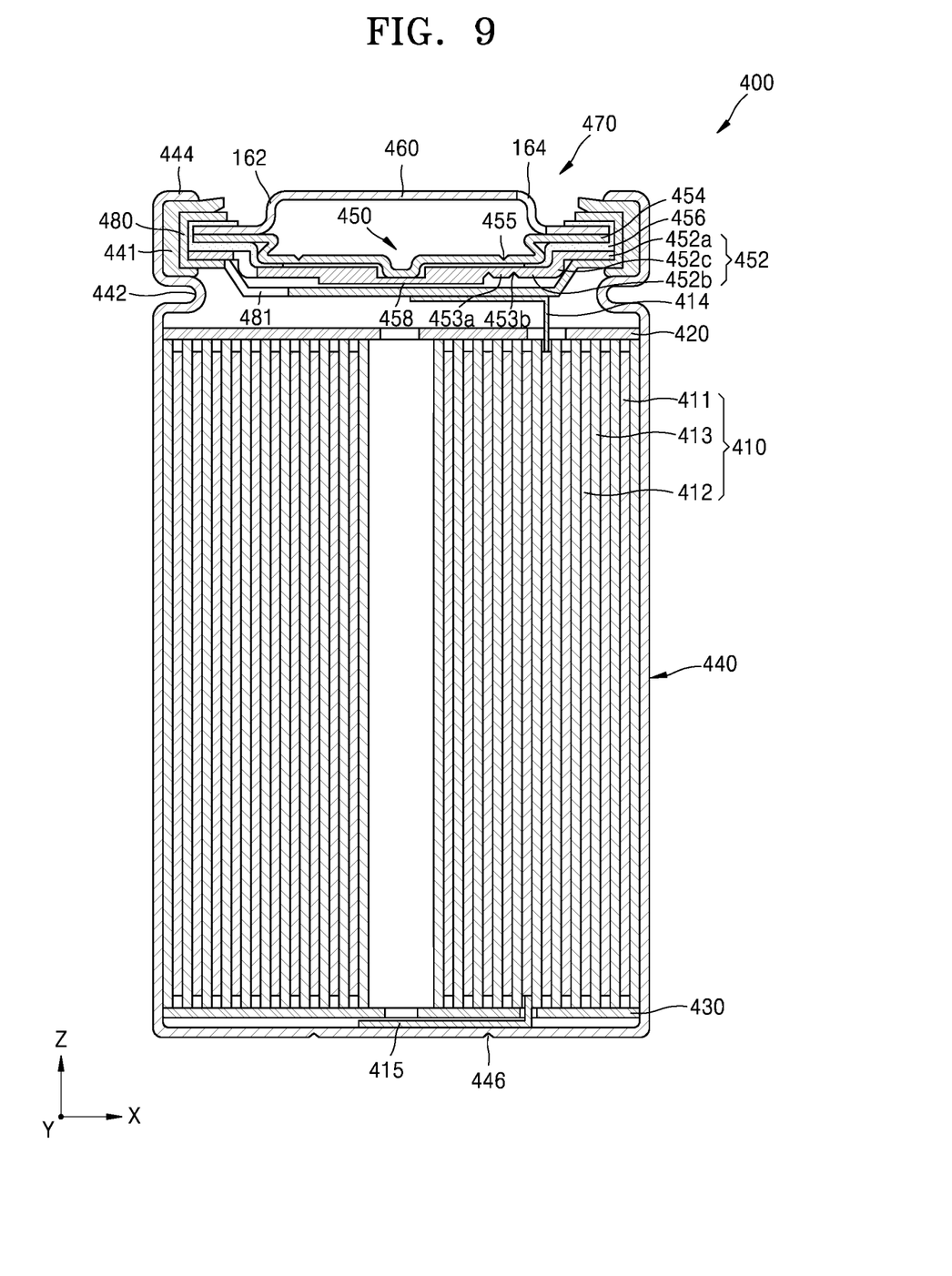
FIG. 9 is a cross-sectional view of a portion of a secondary battery according to an embodiment of the present invention.

FIG. 9 is a cross-sectional view of a portion of a secondary battery 400 according to another embodiment of the present invention.

Referring to FIG. 9, the secondary battery 400 may include an electrode assembly 410, a can 440 accommodating the electrode assembly 410, and a cap assembly 470 coupled to the can 440. The secondary battery 400 may further include a first insulating plate 420 and a second insulating plate 430 inserted into the can 440. In one embodiment, the first insulating plate 420 and the second insulating plate 430 are substantially the same as the first insulating plate 120 and the second insulating plate 130 described above, respectively.

The can 440 may include a beading portion 442 and a crimping portion 444. In one embodiment, the beading portion 442 and the crimping portion 444 are substantially the same as the beading portion 142 and the crimping portion 144 described above, respectively.

The electrode assembly 410 may include a first electrode plate 411, a second electrode plate 412, and a separator 413. In one embodiment, the first electrode plate 411, the second electrode plate 412, and the separator 413 are substantially the same as the first electrode plate 111, the second electrode plate 112, and the separator 113 described above, respectively.

A first electrode tab 414 may be electrically connected to the first electrode plate 411, and a second electrode tab 415 may be electrically connected to the second electrode plate 412. In one embodiment, the second electrode tab 415 may be attached to the bottom surface of the can 440.

The cap assembly 470 may include a gasket 441, a current breaking portion 450, a cap-up 460, and a cover plate 480. In one embodiment, the gasket 441 and the cap-up 460 are substantially the same as the gasket 141 and the cap-up 160 described above, respectively.

The current breaking portion 450 may include a vent portion 454 including a first notch portion 455. The current breaking portion 450 may further include a cap-down 452 including a second notch portion 453b and a dislocation portion 453a, and an insulator 456 between the cap-down 452 and the vent portion 454. The current breaking portion 450 may further include a sub-disk 458 connected to the cap-down 452. In one embodiment, the dislocation portion 453a may be connected to portion of the cap-down 452 by a support portion formed on the second notch portion 453b. In one embodiment, the sub-disk 458 may be formed integrally with the cap-down 452 or may be formed separately from the cap-down 452 and may be attached to the cap-down 452. Hereinafter, solely for convenience of explanation, the sub-disk 458 formed integrally with the cap-down 452 will be described.

The first notch portion 455 and the second notch portion 453b may each have a ring shape. In one embodiment, a diameter of the first notch portion 455 may be larger than a diameter of the second notch portion 453b.

The cap-down 452 may include a first upper plate 452a, a first lower plate 452b, and first bridge portions 452c. In one embodiment, the first bridge portions 452c may connect the first upper plate 452a and the first lower plate 452b, and space may be formed between the adjacent first bridge portions 452c. In one embodiment, gas generated inside the can may flow through the spaces between the adjacent first bridge portions 452c.

The insulator 456 may be positioned between the vent portion 454 and the cap-down 452 and may separate at least a portion of the cap-down 452 from the vent portion 454. In one embodiment, the insulator 456 may wrap around and cover an outside edge of at least one of the vent portion 454, the cap-down 452, and the cap-up 460. In one embodiment, the insulator 456 may completely seal the space between the vent portion 454 and the cap-down 452. However, hereinafter, solely for convenience of explanation, the insulator 456 covering the outside edge of each of the vent portion 454, the cap-down 452, and the cap-up 460 will be described.

The cover plate 480 may cover the insulator 456. In one embodiment, the cover plate 480 may include at least one fluid hole 481. When the cover plate 480 includes at least one fluid hole 481, the gas generated inside the can 440 may flow from the inside of the can 440 toward the cap-up 460 through the fluid hole 481.

An area of the fluid hole 481 may be 10 mm$^2$ or less. When the area of the fluid hole 481 is larger than 10 mm$^2$, the gas inside the can 440 may move too rapidly, or too much heat from the inside of the can 440 may be transmitted to the cap assembly 470, and the cap assembly 470 may be damaged or separated from the can 440.

When the temperature inside of the can 440 accommodating the secondary battery 440 increases, gas may be generated inside the can 440. The generated gas may then pass through the fluid hole 481 and burn and destroy the insulator 456, and may be injected into the space between the vent portion 454 and the cap-down 452.

In one embodiment, the vent portion 454 and at least a portion of the cap-down 452 may first contact each other, and later may be separated from each other. Since the cover plate 480 and the cap-down 452 contact each other, when the vent portion 454 and at least a portion of the cap-down 452 are separated from each other, the first electrode tab 414 connected to the cover plate 480 may be short circuited.

If the internal pressure inside the can 440 continues to increase after the process described above takes place, the pressure between the vent portion 454 and the cap-down 452 may also increase. In one embodiment, when the pressure between the vent portion 454 and the cap-down 452 increases, the first notch portion 455 ruptures, such that at least a portion of the vent portion 454 may open.

Also, when the internal pressure of the can 440 continues to increase due explosion or the like, and the second notch portion 453b has already ruptured, the dislocation portion 453a may also open.

In addition, the third notch portion 446 may also rupture, along with the second notch portion 453b, and the gas, heat, and electrolyte from inside the can 440 may be released and may flow toward the top and bottom of the can 440.

In one embodiment, the cap assembly 470 and the secondary battery 400 may release the gas and heat generated due to the heating or explosion inside the can 440, towards the top and bottom of the can 440. Accordingly, increase of the temperature inside the can 440 and damage to the side of the can 440 can be prevented or reduced.

In one embodiment, the cap assembly 470 and the secondary battery 400 smoothly release the gas, heat, and electrolyte from inside the can 440 to the outside, thus improving the stability of the secondary battery 400.

It should be understood that the exemplary embodiments described therein should be considered in a descriptive sense only and not for purposes of limitation. As those skilled in the art would realize, the described embodiments may be modified in various different ways, all without departing from the spirit or scope of the present invention as defined by the following claims and equivalents thereof.

What is claimed is:

1. A cap assembly comprising:
a cap-down, at least a portion of the cap-down configured to open when pressure is applied to the cap-down;
a vent plate comprising a first notch configured to open when pressure is applied to the vent plate, wherein the vent plate is entirely spaced from the cap-down;
a stepped insulator between the vent plate and the cap-down, the insulator being configured to be destroyed by being burned by gas, such that when the insulator burns a space forms between the cap-down and the vent plate for the gas to enter; and
a cap-up electrically connected to the vent plate,
wherein each of the cap-down and the vent plate has a stepped portion that is aligned with the stepped insulator,
wherein the cap-down comprises a peripheral opening configured to let gas enter the space between the cap-down and the vent plate, the peripheral opening being completely sealed by the stepped insulator, and a central opening in a center of the cap-down, and no other openings,
wherein the cap-down further comprises:
a dislocation disk configured to open when pressure is applied to the cap-down; and
a second notch around the dislocation disk, the second notch defining a region of the dislocation disk that opens when pressure is applied to the cap-down, a diameter of the second notch being smaller than a diameter of the first notch,
wherein the cap assembly comprises a sub-disk coupled to each of the cap-down and the vent plate and covering the central opening of the cap-down, the vent plate and the cap-down being connected to each other through the sub-disk, and wherein the sub-disk, the cap-down, and the vent plate are sequentially arranged in a direction from the sub-disk toward the vent plate, such that an upper surface of the sub-disk contacts a lower surface of each of the cap-down and the vent plate.

2. The cap assembly of claim 1, wherein the cap-down further comprises a support portion in the second notch and connecting the dislocation disk with another region of the cap-down.

3. The cap assembly of claim 1, wherein a thickness of the second notch is smaller than a thickness of the dislocation disk.

4. The cap assembly of claim 1,
wherein the dislocation disk comprises a plurality of dislocation disks and the second notch comprises a plurality of second notches, the plurality of dislocation disks being spaced from one another, and each of the plurality of second notches being around a respective one of the plurality of dislocation disks.

5. The cap assembly of claim 4, wherein each of the plurality of dislocation disks forms the same angle with the center of the cap-down.

6. The cap assembly of claim 4, wherein each of the plurality of dislocation disks is the same distance away from the center of the cap-down.

7. The cap assembly of claim 1, wherein the dislocation disk and the second notch are circles.

8. The cap assembly of claim 1, wherein the cap-down comprises the dislocation disk in at least one region of the cap-down.

9. The cap assembly of claim 8, wherein a thickness of the dislocation disk is smaller than a thickness of the region of the cap-down not comprising the dislocation disk.

10. The cap assembly of claim 8, wherein the dislocation disk comprises a plurality of dislocation disks, and the plurality of dislocation disks are spaced from one another.

11. The cap assembly of claim 10, wherein each of the plurality of dislocation disks forms the same angle with the center of the cap-down.

12. The cap assembly of claim 10, wherein each of the plurality of dislocation disks is the same distance away from the center of the cap-down.

13. The cap assembly of claim 8, wherein the dislocation disk is a circle.

14. The cap assembly of claim 1, wherein an edge of the vent plate extends beyond an edge of the cap-up and is bent to cover at least a portion of an upper surface of the cap-up.

15. The cap assembly of claim 1, wherein the insulator covers an edge of at least one of the cap-down, the vent plate, and the cap-up.

16. The cap assembly of claim 15, further comprising a cover plate covering the insulator, the cover plate comprising a fluid hole.

17. The cap assembly of claim 16, wherein an area of the fluid hole is 10 mm$^2$ or less.

18. The cap assembly of claim 1, wherein the cap-down comprises:
a lower plate;
an upper plate spaced from the lower plate; and
a plurality of bridge portions connecting the upper plate and the lower plate, the plurality of bridge portions forming the stepped portion of the cap-down,
wherein spaces between adjacent bridge portions comprise the insulator.

19. The cap assembly of claim 1, wherein
the first notch is configured to open when the gas pressure in the space between the vent plate and the cap-down increases to a first level; and
the dislocation disk of the cap-down is configured to open after the first notch, when the gas pressure in the space between the vent plate and the cap-down further increases to a second level.

20. A secondary battery comprising:
an electrode assembly;
a can accommodating the electrode assembly, the can comprising an opening; and
a cap assembly covering the opening of the can,
wherein the cap assembly comprises
a cap-down, at least a portion of the cap-down configured to open when internal pressure of the can increases;
a vent plate comprising a first notch configured to open when internal pressure of the can increases, wherein the vent plate is entirely spaced from the cap-down;
a stepped insulator between the vent plate and the cap-down, the insulator being configured to be destroyed by being burned by gas, such that when the insulator burns a space forms between the cap-down and the vent plate for the gas to enter; and
a cap-up electrically connected to the vent plate,
wherein each of the cap-down and the vent plate has a stepped portion that is aligned with the stepped insulator,
wherein the cap-down comprises a peripheral opening configured to let gas enter the space between the cap-down and the vent plate, the peripheral opening being completely sealed by the stepped insulator, and a central opening in a center of the cap-down, and no other openings,
wherein the cap-down further comprises:
a dislocation disk configured to open when pressure is applied to the cap-down; and
a second notch around the dislocation disk, the second notch defining a region of the dislocation disk that opens when pressure is applied to the cap-down, a diameter of the second notch being smaller than a diameter of the first notch,
wherein the cap assembly comprises a sub-disk coupled to each of the cap-down and the vent plate and covering the central opening of the cap-down, the vent plate and the cap-down being connected to each other through the sub-disk, and
wherein the sub-disk, the cap-down, and the vent plate are sequentially arranged in a direction from the sub-disk toward the vent plate, such that an upper surface of the sub-disk contacts a lower surface of each of the cap-down and the vent plate.

21. The secondary battery of claim 20, wherein the cap-down further comprises a support portion in the second notch and connecting the dislocation disk with another region of the cap-down.

22. The secondary battery of claim 20, wherein a thickness of the second notch is smaller than a thickness of the dislocation disk.

23. The secondary battery of claim 20,
wherein the dislocation disk comprises a plurality of dislocation disks and the second notch comprises a plurality of second notches, the plurality of dislocation disks being spaced from one another, and each of the plurality of second notches being around a respective one of the plurality of dislocation disks.

24. The secondary battery of claim 23, wherein each of the plurality of dislocation disks forms the same angle with the center of the cap-down.

25. The secondary battery of claim 23, wherein each of the plurality of dislocation disks is the same distance away from the center of the cap-down.

26. The secondary battery of claim 20, wherein the dislocation disk and the second notch are circles.

27. The secondary battery of claim 20, wherein at least one region of the cap-down comprises the dislocation disk, the dislocation disk configured to rupture when internal pressure of the can increases.

28. The secondary battery of claim 27, wherein a thickness of the dislocation disk is smaller than a thickness of the region of the cap-down not comprising the dislocation disk.

29. The secondary battery of claim 27, wherein the dislocation disk comprises a plurality of dislocation disks, and the plurality of dislocation disks are spaced from one another.

30. The secondary battery of claim 29, wherein each of the plurality of dislocation disks forms the same angle with the center of the cap-down.

31. The secondary battery of claim 29, wherein each of the plurality of dislocation disks is the same distance away from the center of the cap-down.

32. The secondary battery of claim 27, wherein the dislocation disk is a circle.

33. The secondary battery of claim 20, wherein an edge of the vent plate extends beyond an edge of the cap-up is bent to cover at least a portion of an upper surface of the cap-up.

34. The secondary battery of claim 20, wherein the insulator covers an edge of at least one of the cap-down, the vent plate, and the cap-up.

35. The secondary battery of claim 34, further comprising a cover plate covering the insulator, the cover plate comprising a fluid hole.

36. The secondary battery of claim 35, wherein an area of the fluid hole is 10 mm$^2$ or less.

37. The secondary battery of claim 20, wherein the cap-down comprises:
a lower plate;
an upper plate spaced from the lower plate; and
a plurality of bridge portions connecting the upper plate and the lower plate, the plurality of bridge portions forming the stepped portion of the cap-down,
wherein spaces between adjacent bridge portions comprise the insulator.

38. The secondary battery of claim 20, wherein
the first notch is configured to open when the gas pressure in the space between the vent plate and the cap-down increases to a first level; and
the dislocation disk of the cap-down is configured to open after the first notch, when the gas pressure in the space between the vent plate and the cap-down further increases to a second level.

\* \* \* \* \*